July 12, 1955 W. S. CONAWAY 2,712,948
TRAILER TRUCK FIFTH WHEEL
Filed Oct. 8, 1953 2 Sheets-Sheet 1

William S. Conaway
INVENTOR

BY C.A. Snow & Co.
ATTORNEYS.

July 12, 1955 W. S. CONAWAY 2,712,948
TRAILER TRUCK FIFTH WHEEL
Filed Oct. 8, 1953 2 Sheets-Sheet 2
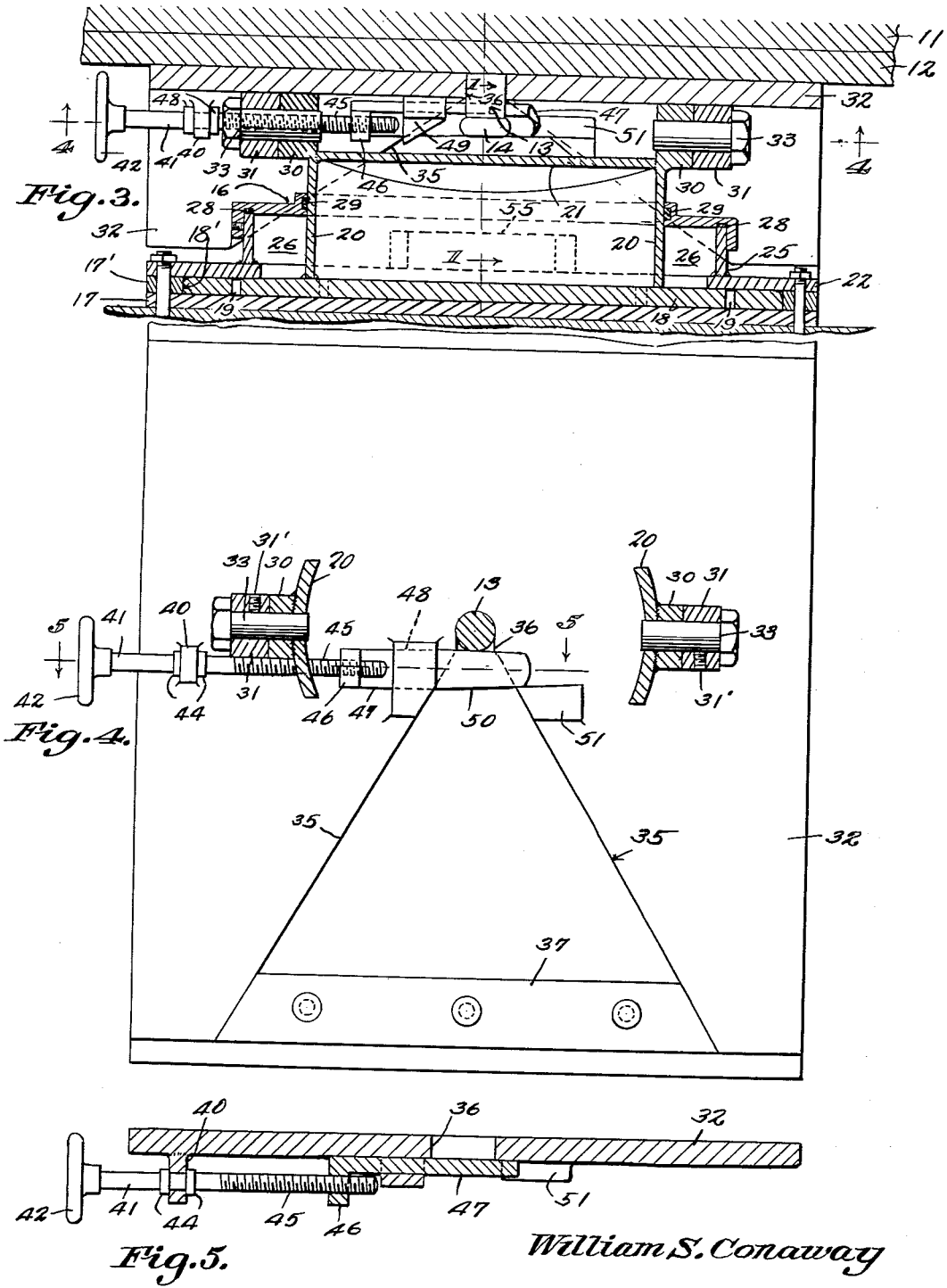
William S. Conaway
INVENTOR

United States Patent Office 2,712,948
Patented July 12, 1955

2,712,948

TRAILER TRUCK FIFTH WHEEL

William S. Conaway, Carrollton, Mo.

Application October 8, 1953, Serial No. 385,001

3 Claims. (Cl. 280—437)

This invention relates to a device for attaching a towed vehicle to a towing vehicle, or what is commonly called in the art a trailer truck fifth wheel.

A primary object of this invention is the provision of a device of this character which will insure a firm and secure attachment of the towed vehicle to the towing vehicle.

A further object of the invention is the provision of a device which will preclude "jackknifing" of the towed vehicle.

Still another object of the invention is the provision of reliable lubrication in the fifth wheel at all times.

Still other objects reside in the combination of elements arrangements of parts and features of construction, all as will be more fully pointed out hereinafter and shown in the accompanying drawings wherein there is disclosed a preferred embodiment of this inventive concept.

In the drawings:

Fig. 3 is a sectional view taken substantially along the line 3—3 of Fig. 1 as viewed in the direction indicated by the arrows.

Fig. 4 is a sectional view taken along the line 4—4 of Fig. 3 as viewed in the direction indicated by the arrows, and Fig. 5 is a sectional view taken along the line 5—5 of Fig. 4.

Similar reference characters refer to similar parts throughout the several views of the drawings.

Figure 1:
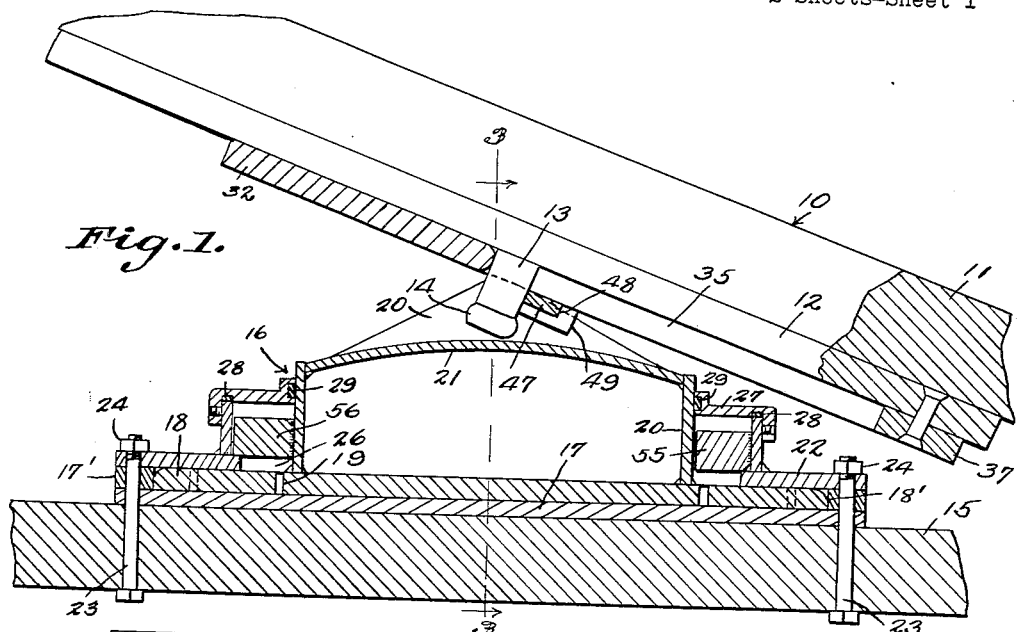
Figure 1 is a side sectional view of one form of device embodying this inventive concept.
Figure 2:
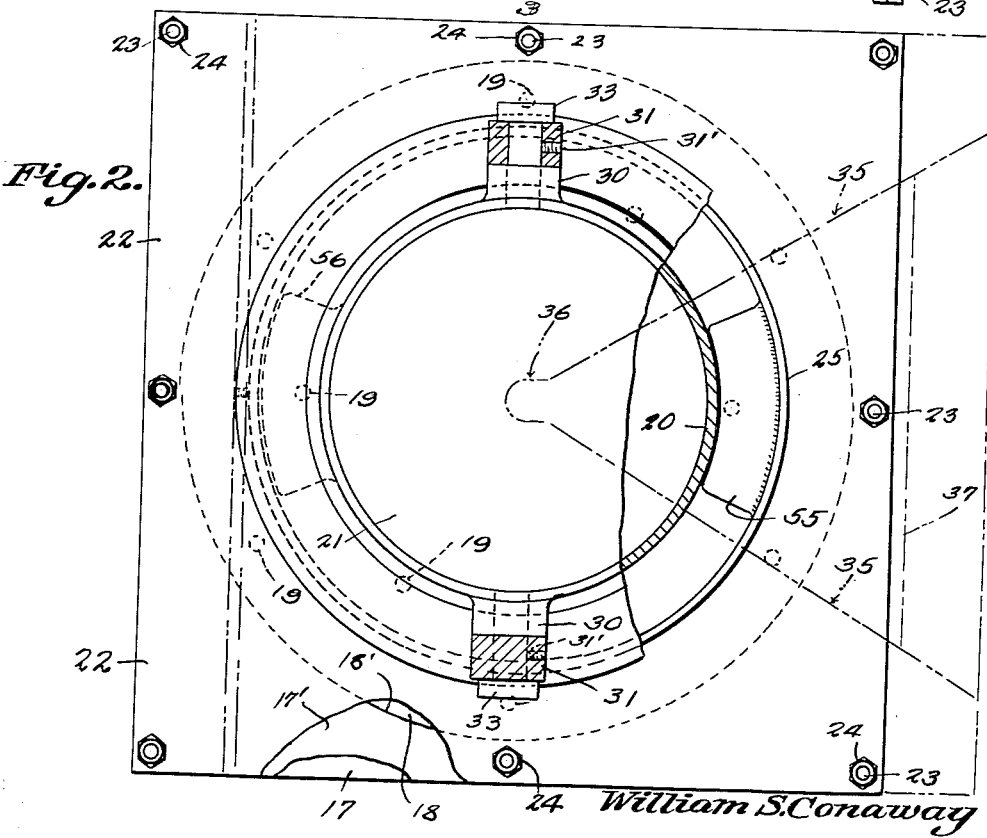
Fig. 2 is a top plan view, partially sectioned, with the tractor plate removed.

Having reference now to the drawings in detail, and more particularly to Fig. 1, there is generally indicated at 10 a portion of a vehicle to be towed, which includes a body 11 and an attaching plate 12. Plate 12 has secured thereto a stud 13 having a head 14, all of conventional construction, and adapted to be attached to the fifth wheel of the towing vehicle in a manner to be more fully described hereinafter.

A fragment of the body of the towing vehicle is generally indicated at 15, and has secured thereto the fifth wheel of the instant invention generally indicated at 16, and which includes a base plate 17 on which a plate 17' is mounted and secured by bolts 23, the plate 17' having a circular opening 18'. Mounted on the base plate 17 is a rotatable circular plate 18, having a plurality of apertures 19 extending therethrough, the plate 18 being held in said circular opening 18'. Plate 18 is provided with a circular flange 20 extending upwardly therefrom, and is provided with an arcuate closure member 21 across the top thereof. A rectangular plate 22 is positioned over the circular plate 18, and is secured to the vehicle body 15 as by means of bolts 23 and nuts 24 extending through suitable aligned apertures in the successive plates. Plate 22 is provided with a circular flange 25 spaced radially from the flange 20 and providing a lubricant channel 26 which communicates with the apertures 19 in plate 18, to provide lubrication between the base of plate 18 and plate 17, to permit free rotation of the device.

A sealing ring 27 closes the top of the channel 26, and is provided with sealing gaskets 28 and 29 in abutting relation with flanges 25 and 20 respectively.

As best shown in Fig. 3 flange 20 is provided with a pair of opposed lugs 30, which serve as pivots for a pair of spaced lugs 31 carried by a connecting plate 32, the parts being secured in related assembly by means of screws 33.

Plate 32 is provided with a triangular aperture 35 which terminates in a rounded apex 36 for the reception of the member 13. The base of the aperture is closed by a bar 37 which is carried by the trailer or towed vehicle and moves within the wide end of the triangular aperture guiding the sections of the fifth wheel together and at the same time holding the towed vehicle against lateral movement.

Referring now to the securing means in detail the under side of plate 32 is provided with a lug 40, through which extends a threaded member 41 provided with a wheel 42 to facilitate turning the same. The member 41 is provided with a pair of spaced flanges 44 on opposite sides of the lug 40 whereby the same may be rotated and held against longitudinal movement. Threaded portion 45 of member 41 extends through a threaded aperture in a lug 46 which extends from a bolt member 47, the bolt extending through an aperture 48 in a projecting member 49 adjacent the edge of the triangular aperture in plate 32. Bolt 47 is tapered as indicated at 50, and when in locking position, as best shown in Fig. 4, is adapted to engage a lug 51 to effect a camming action, clamping the bolt tightly against stud 13.

Extending inwardly from the flange 25 is a stop lug 55 that is engaged by the lug 56 extending outwardly from the flange 20, the lugs 55 and 56 being so arranged with respect to each other that when the fifth wheel rotates to a point so that the lug 56 contacts the lug 55, further movement of the movable elements of the fifth wheel in one direction will be prevented, thereby preventing what is commonly known as jackknifing.

It will thus be seen that rotation of the operating wheel 42 serves tightly to clamp the stud 13 in the aperture 36, thus effecting a secure and firm connection between the trailer and the towing vehicle.

The channel 26 is adapted to be filled with a lubricant such as grease or heavy oil, which lubricant penetrates through the apertures 19, thus lubricating the device for rotation when in use.

From the foregoing it will now be seen that there is herein provided a device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device of the character described in combination, a base plate, a rotatable plate mounted thereon, a flange on said rotatable plate, a closure plate, a flange on said closure plate, spaced from said first mentioned flange providing a space between said flanges for the reception of lubricant, said rotatable plate having apertures therein to permit the passage of lubricant to said base plate, lugs carried by said first mentioned flange, a connecting plate pivotally mounted on said lugs, an aperture in said connecting plate adapted for the reception of a connecting pin, and means adapted to secure said pin in said aperture.

2. In a device of the character described in combination, a base plate, a rotatable plate mounted thereon, a flange on said rotatable plate, a closure plate, a flange on said closure plate, spaced from said first mentioned flange providing a space between said flanges for the reception of lubricant, said rotatable plate having apertures therein to permit the passage of lubricant to said base plate, lugs carried by said first mentioned flange, a connecting plate pivotally mounted on said lugs, an aperture in said connecting plate adapted for the reception of a connecting pin, means adapted to secure said pin in said aperture, said last mentioned means comprising a bolt, and means for moving said bolt across said aperture.

3. In a device of the character described in combination, a base plate, a rotatable plate mounted thereon, a flange on said rotatable plate, a closure plate, a flange on said closure plate, spaced from said first mentioned flange providing a space between said flanges for the reception of lubricant, said rotatable plate having apertures therein to permit the passage of lubricant to said base plate, lugs carried by said first mentioned flange, a connecting plate pivotally mounted on said lugs, an aperture in said connecting plate adapted for the reception of a connecting pin, means adapted to secure said pin in said aperture, said last mentioned means comprising a bolt, means for moving said bolt across said aperture, a cam surface on said bolt, and a lug engageable with said cam surface for effecting a wedging action of said bolt against said connecting pin.

References Cited in the file of this patent

UNITED STATES PATENTS

| | | |
|---|---|---|
| 2,285,784 | Scott | June 9, 1942 |
| 2,431,779 | Stevens | Dec. 2, 1947 |
| 2,508,610 | Kendall | May 23, 1950 |
| 2,567,312 | Apgar | Sept. 11, 1951 |
| 2,665,177 | Schaefer | Jan. 5, 1954 |
| 2,667,364 | Colpo | Jan. 26, 1954 |
| 2,676,817 | White | Apr. 27, 1954 |